(12) United States Patent
Chengson et al.

(10) Patent No.: US 8,452,908 B2
(45) Date of Patent: May 28, 2013

(54) LOW LATENCY SERIAL MEMORY INTERFACE

(75) Inventors: David P. Chengson, Aptos, CA (US); Chang-Hong Wu, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 374 days.

(21) Appl. No.: 12/648,373

(22) Filed: Dec. 29, 2009

(65) Prior Publication Data

US 2011/0161544 A1 Jun. 30, 2011

(51) Int. Cl.
| G06F 13/14 | (2006.01) |
| G06F 3/00 | (2006.01) |
| G06F 5/00 | (2006.01) |
| G06F 1/04 | (2006.01) |
| G06F 1/12 | (2006.01) |
| G06F 5/06 | (2006.01) |

(52) U.S. Cl.
USPC .............. 710/305; 710/61; 713/600; 711/154

(58) Field of Classification Search
USPC .............. 710/61, 154, 305; 713/600; 711/154
See application file for complete search history.

(56) References Cited

U.S. PATENT DOCUMENTS

| 4,901,351 | A | * | 2/1990 | Tanaka et al. | 380/223 |
| 4,953,210 | A | * | 8/1990 | McGlynn et al. | 380/266 |
| 5,025,414 | A | * | 6/1991 | Iwamoto | 710/305 |
| 5,654,531 | A | * | 8/1997 | Farabee et al. | 187/247 |
| 6,009,527 | A | * | 12/1999 | Traw et al. | 726/15 |
| 6,301,637 | B1 | * | 10/2001 | Krull et al. | 711/112 |
| 7,000,037 | B2 | * | 2/2006 | Rabinovitz et al. | 710/71 |
| 7,031,330 | B1 | * | 4/2006 | Bianchini, Jr. | 370/412 |
| 7,089,379 | B1 | * | 8/2006 | Sharma et al. | 711/154 |
| 7,539,800 | B2 | * | 5/2009 | Dell et al. | 710/100 |
| 7,730,274 | B1 | * | 6/2010 | Usgaonkar | 711/163 |
| 2003/0131310 | A1 | * | 7/2003 | Pitio | 714/800 |
| 2004/0071163 | A1 | * | 4/2004 | Hogberg et al. | 370/468 |
| 2004/0258085 | A1 | * | 12/2004 | Costo | 370/445 |
| 2005/0055467 | A1 | * | 3/2005 | Campana et al. | 709/253 |
| 2005/0251727 | A1 | * | 11/2005 | Kim et al. | 714/758 |
| 2006/0095703 | A1 | * | 5/2006 | Ferraiolo et al. | 711/170 |
| 2007/0002965 | A1 | * | 1/2007 | Bauch et al. | 375/295 |
| 2007/0112986 | A1 | * | 5/2007 | Chang | 710/116 |
| 2008/0124092 | A1 | * | 5/2008 | Dvir et al. | 398/155 |

(Continued)

FOREIGN PATENT DOCUMENTS

| JP | 03085982 A | * | 4/1991 |
| JP | 06181572 A | * | 6/1994 |

(Continued)

OTHER PUBLICATIONS

"Interlaken Protocol Definition", Oct. 7, 2008, Cortina Systems Inc. and Cisco Systems Inc., Rev. 1.2, pp. 1-52.*

(Continued)

*Primary Examiner* — Faisal M Zaman
(74) *Attorney, Agent, or Firm* — Harrity & Harrity, LLP

(57) ABSTRACT

A device applies synchronous clocking across a first component and a second component of the device, and designates a particular serial link, from a group of serial links, as a master serial link. The device also designates the remaining serial links as slave serial links, provides, via the master serial link, an encoded data stream, and provides, via the slave serial links, un-encoded and scrambled data streams.

25 Claims, 8 Drawing Sheets

U.S. PATENT DOCUMENTS

| | | | |
|---|---|---|---|
| 2008/0155149 A1* | 6/2008 | de Araujo et al. | 710/107 |
| 2008/0279224 A1* | 11/2008 | Pontius | 370/503 |
| 2008/0301437 A1* | 12/2008 | Chevallier et al. | 713/155 |
| 2009/0049361 A1* | 2/2009 | Koren et al. | 714/755 |
| 2009/0232079 A1* | 9/2009 | Khandekar et al. | 370/329 |
| 2010/0180143 A1* | 7/2010 | Ware et al. | 713/600 |
| 2010/0183309 A1* | 7/2010 | Etemad et al. | 398/79 |
| 2010/0235663 A1* | 9/2010 | Olsson et al. | 713/323 |
| 2010/0325327 A1* | 12/2010 | Marietta et al. | 710/240 |
| 2011/0075782 A1* | 3/2011 | Zhang et al. | 375/376 |
| 2012/0099730 A1* | 4/2012 | Nakamura et al. | 380/287 |

FOREIGN PATENT DOCUMENTS

| | | | |
|---|---|---|---|
| JP | 07015420 A * | 1/1995 | |
| JP | 07273752 A * | 10/1995 | |
| JP | 10013406 A * | 1/1998 | |
| JP | 2012175568 A * | 9/2012 | |
| WO | WO 2004059976 A2 * | 7/2004 | |
| WO | 2008/099958 | 8/2008 | |

OTHER PUBLICATIONS

"Definition of encode", thefreedictionary.com (citing The American Heritage Dictionary of the English Language, Fourth Edition, 2000), retrieved from the Internet on Jun. 19, 2012 at <http://www.thefreedictionary.com/p/encode>, p. 1.*

Long, M.E.; Citta, R., "An enhanced RF television scrambling system using phase modulation ," Consumer Electronics, IEEE Transactions on , vol. 34, No. 2, pp. 302-309, May 1988.*

Kojima, T.; Shida, Y.; Fujino, T., "A study of SLM PAPR reduction of OFDM signals without side information," Advanced Technologies for Communications (ATC), 2010 International Conference on , pp. 168-171, Oct. 20-22, 2010.*

Kazi, K., "Elimination of clock recovery and framing by transporting clock, data and synchronization pulse for OC-192 using WDM," Lightwave Technology, Journal of , vol. 13, No. 11, pp. 2136-2141, Nov. 1995.*

Luthi, D.A.; Mogre, A.; Ben-Efraim, N.; Gupta, A., "A single-chip concatenated FEC decoder," Custom Integrated Circuits Conference, 1995., Proceedings of the IEEE 1995 , pp. 285-288, May 1-4, 1995.*

Extended Search Report for corresponding European Application No. 10167155.0 mailed Jun. 8, 2011, 8 pages.

"National Semiconductor: LVDS Owner's Manual Including High-Speed CML and Signal Conditioning", 4th Edition, Dec. 31, 2008, XP002638550, URL:http://www.national.com/assets/en/appnotes/National_LVDS_Owners_Manual_4th_Edition_2008.pdf, 5 pages.

Wei Zang, Dr. Johnson: "When to Use AC Coupling", Nov. 13, 2001, XP002638551, URL:http://www.sigcon.com/Pubs?news?4_15.htm, 2 pages.

* cited by examiner

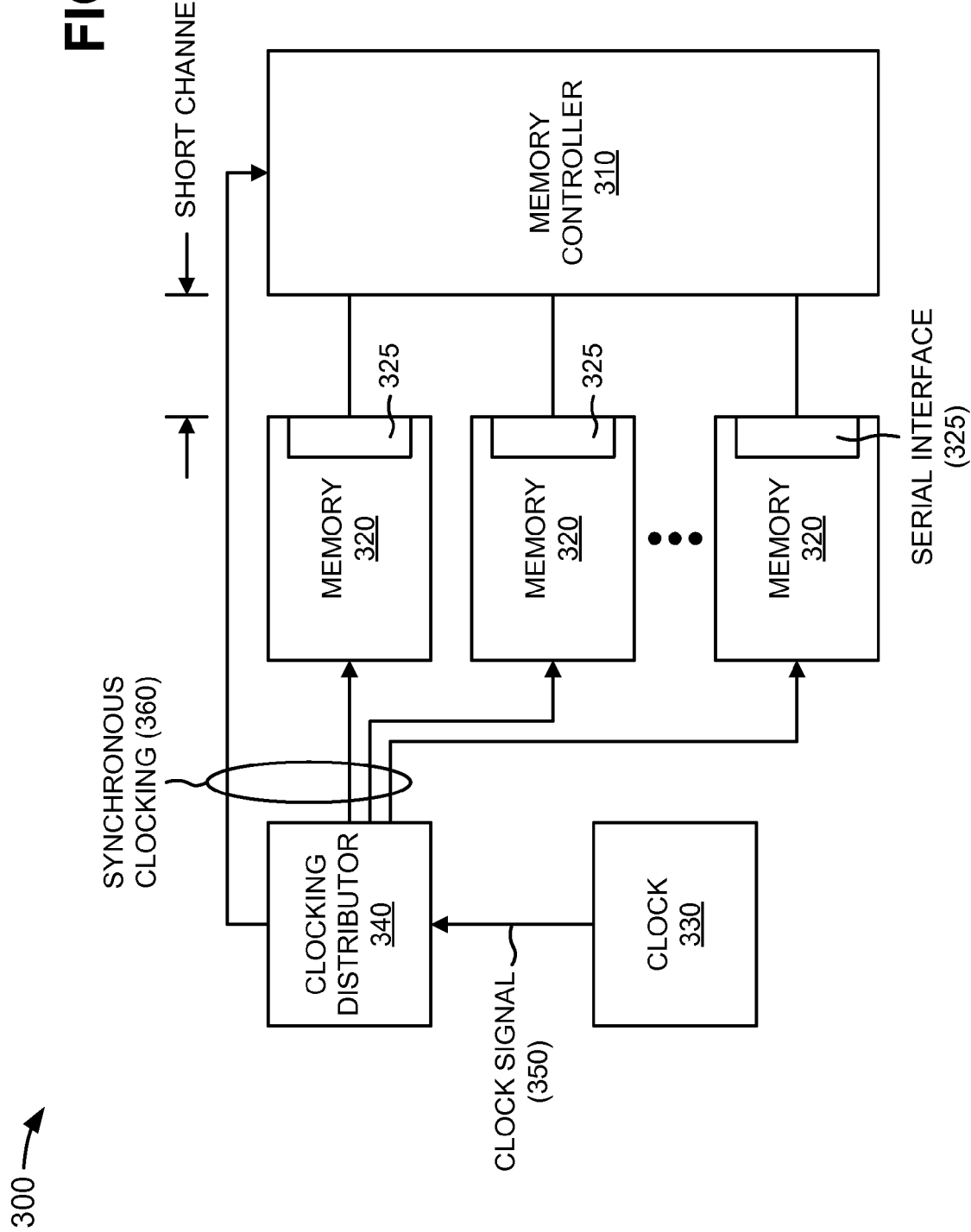

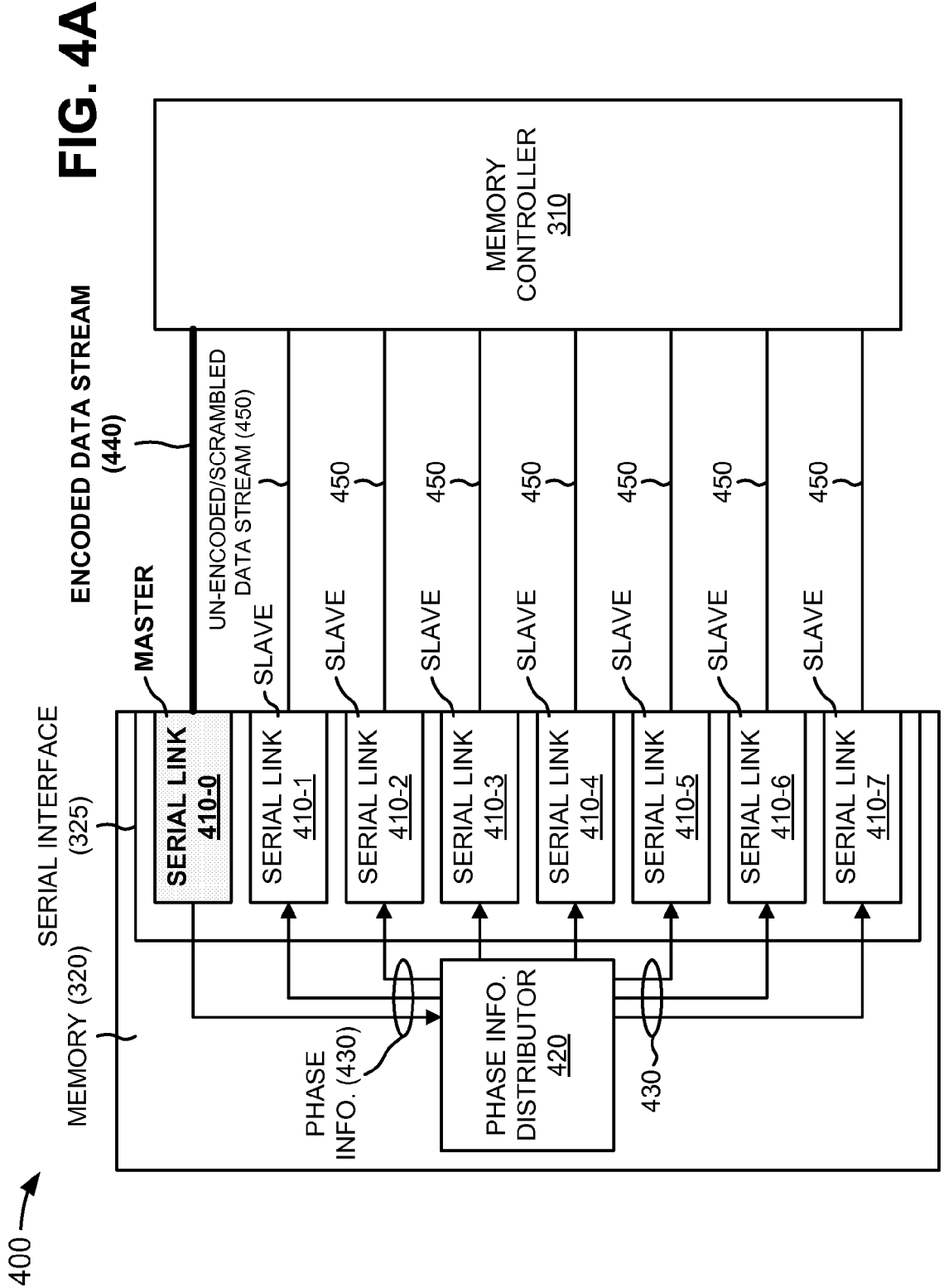

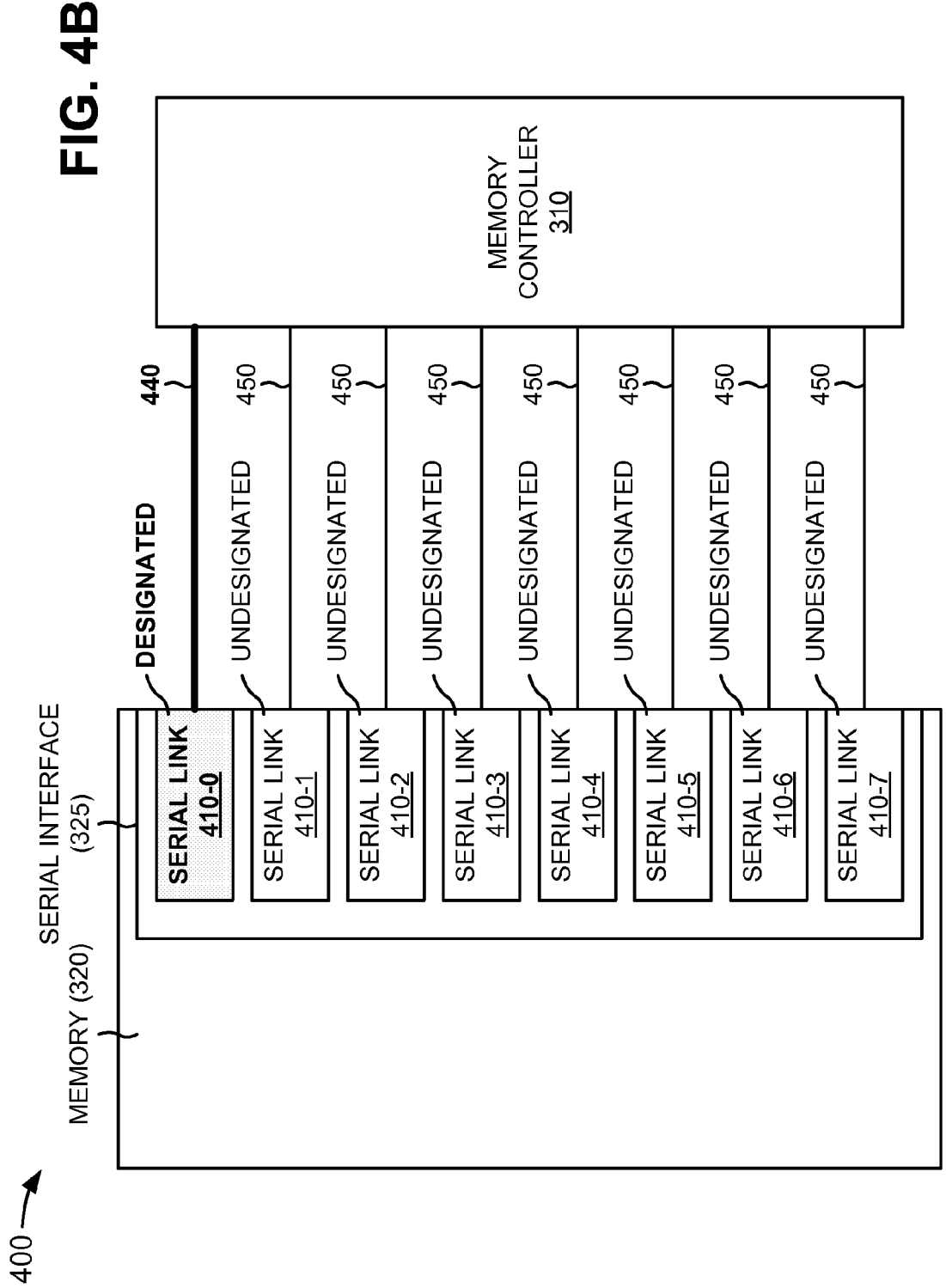

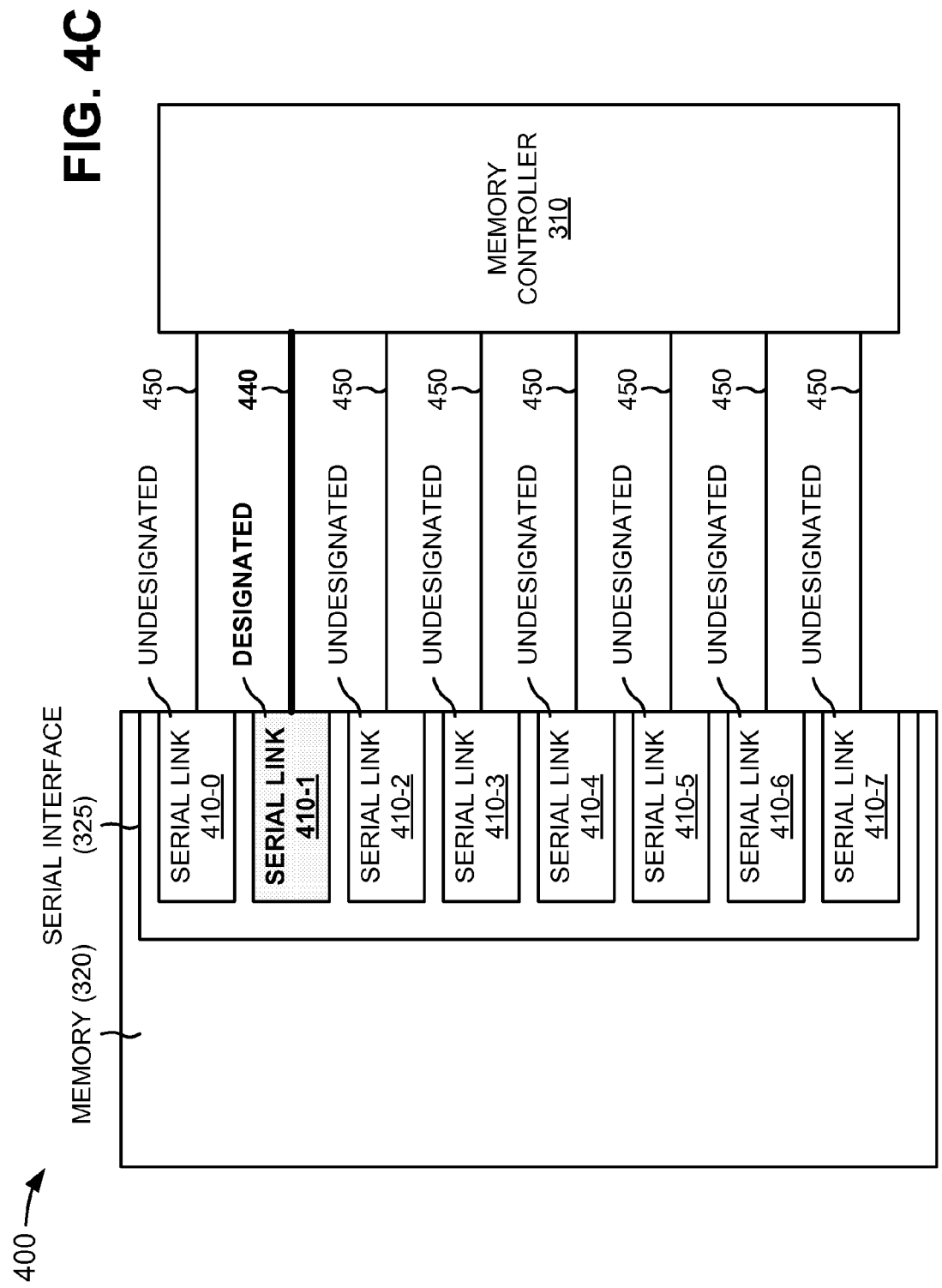

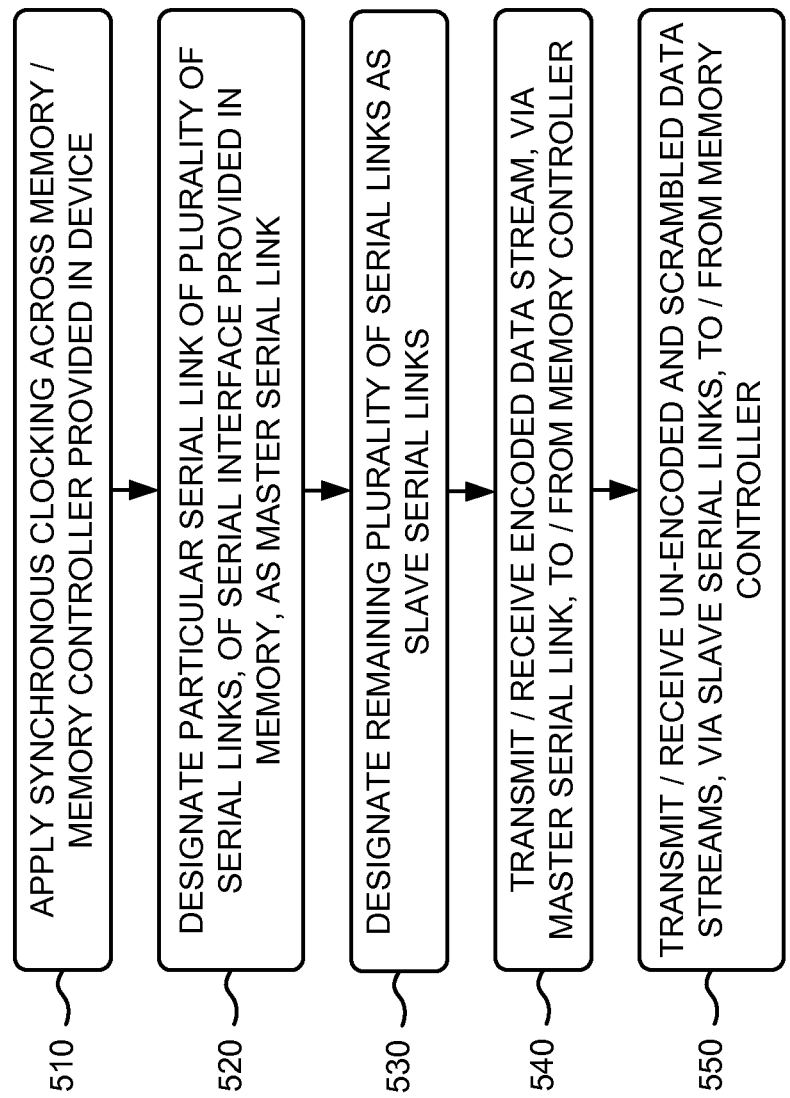

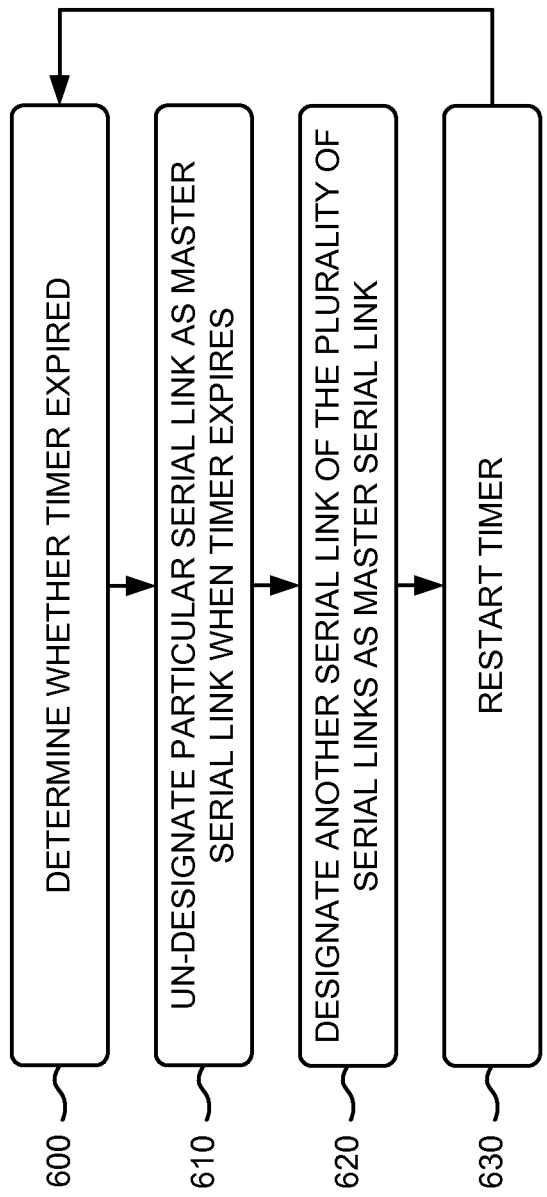

LOW LATENCY SERIAL MEMORY INTERFACE

BACKGROUND

Computing and communication networks typically include devices (e.g., network devices), such as routers, firewalls, switches, servers, or gateways, which transfer or switch data, such as packets, from one or more sources to one or more destinations. Network devices may operate on the packets as the packets traverse the network, such as by forwarding or filtering the packet-based network traffic. Some computing devices (e.g., a personal computer) may not be associated with a network and thus may be referred to as standalone devices. Such network devices and computer devices include memories and interfaces for the memories, such as serial memory interfaces.

Serial memory interfaces require interoperability between different vendors and across different generations of process technologies that typically have different input/output voltages. To facilitate such interoperability, an alternating current (AC)-coupled memory interface is employed. However, unlike traditional serial interfaces between chips with on board AC capacitors for each link, memories (e.g., memory chips) and their interfaces need to be provided adjacent to a memory controller (e.g., to minimize channel loss) and therefore it is impractical to put the AC-coupled capacitors on a board (e.g., associated with the memories and the memory controller). Thus, AC-coupled capacitors are provided on chips. The small sizes of such AC-coupled capacitors (e.g., provided on chips) limit the number of consecutive identical digits (CIDs) (e.g., consecutive "0s" or "1s") that may be provided in a data stream due to clock data recovery (CDR) and data dependent direct current (DC) baseline wander.

Thus, serial memory interfaces are faced with a DC balance problem and a CID problem. If a data stream provided to/from a serial memory interface is not DC balanced, it will lead to charge build up over the long term, which will lead to DC baseline wander. A long CID will lead to a charge storage problem on the capacitor, which may be solved by using a larger capacitor on the board. However, as described above, AC-coupled capacitors must be provided on chips (e.g., rather than on the board) and are limited in size. A long CID will also lead to clock data recovery (CDR) issues, as described above. Another problem with serial memory interfaces is that traditional asynchronous clocking is used with serial links provided between transmitters and receivers. Since a frequency offset (e.g., in parts per million (ppm)) between different clock mechanisms (e.g., crystal oscillators) leads to phase build up, additional latency and circuitry is incurred to compensate for this phase build up. Also there is a potential negative impact on a serial link's bit error rate (BER) when there is a large number of CIDs in a data stream. Furthermore, some serial memory interfaces with clock recovery typically utilize asynchronous clocking between a transmitter and a receiver, which results in latency overhead for encoding and associated logic.

SUMMARY

According to one aspect, a method may be implemented by a device that includes a memory and a memory controller. The method may include designating, by the device and as a master serial link, a particular serial link from a group of serial links of a serial interface provided in the memory; designating, by the device, the remaining serial links as slave serial links; providing, via the master serial link, an encoded data stream; and providing, via the slave serial links, un-encoded and scrambled data streams.

According to another aspect, a device may contain a memory that includes a serial interface with a group of serial links, and logic. The logic may designate a particular serial link, of the group of serial links, as a master serial link, and may designate the remaining group of serial links as slave serial links. The logic may also provide, via the master serial link, an encoded data stream, and may provide, via the slave serial links, un-encoded and scrambled data streams.

According to still another aspect, a device may include means for applying synchronous clocking across a first component and a second component of the device, where the first component includes a serial interface with a group of serial links. The device may also include means for designating a particular serial link, of the group of serial links, as a designated serial link, and means for transmitting or receiving, via the designated serial link, an encoded data stream to or from the second component. The device may further include means for transmitting or receiving, via the remaining group of serial links, un-encoded and scrambled data streams to or from the second component.

According to a further aspect, a component may include an interface with a group of links, and logic to define a particular link, of the group of links, as a designated link. The logic may also define the remaining group of links as undesignated links, provide, via the designated link, an encoded data stream, and provide, via the undesignated links, un-encoded and scrambled data streams.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 3 is a diagram of exemplary interactions among components of an exemplary portion of the device depicted in FIG. 1;

FIGS. 4A-4C are diagrams of exemplary interactions among components of another exemplary portion of the device depicted in FIG. 1; and FIGS. 5 and 6 are flow charts of an exemplary process for providing a low latency serial interface according to implementations described herein.

DETAILED DESCRIPTION

The following detailed description refers to the accompanying drawings. The same reference numbers in different drawings may identify the same or similar elements. Also, the following detailed description does not limit the invention.

Implementations described herein may provide systems and/or methods that utilize clock recovery, scrambled data, on-chip AC-coupled interfaces with synchronous clocking between a transmitter and a receiver, and low latency data encoding. The systems and/or methods may ensure a DC-balanced data pattern and deterministic CIDs with improved clock data recovery bandwidth and overall serial link BER. The systems and/or methods may enable serial interfaces to be embedded in memories rather than provided on a board associated with the memories (e.g., which may be prohibitive due to size constraints of the board). In addition, the systems and/or methods may distribute a synchronous system clock to a memory controller and to the memories, which may reduce an overall latency for the serial interfaces.

Exemplary Network

Figure 1:
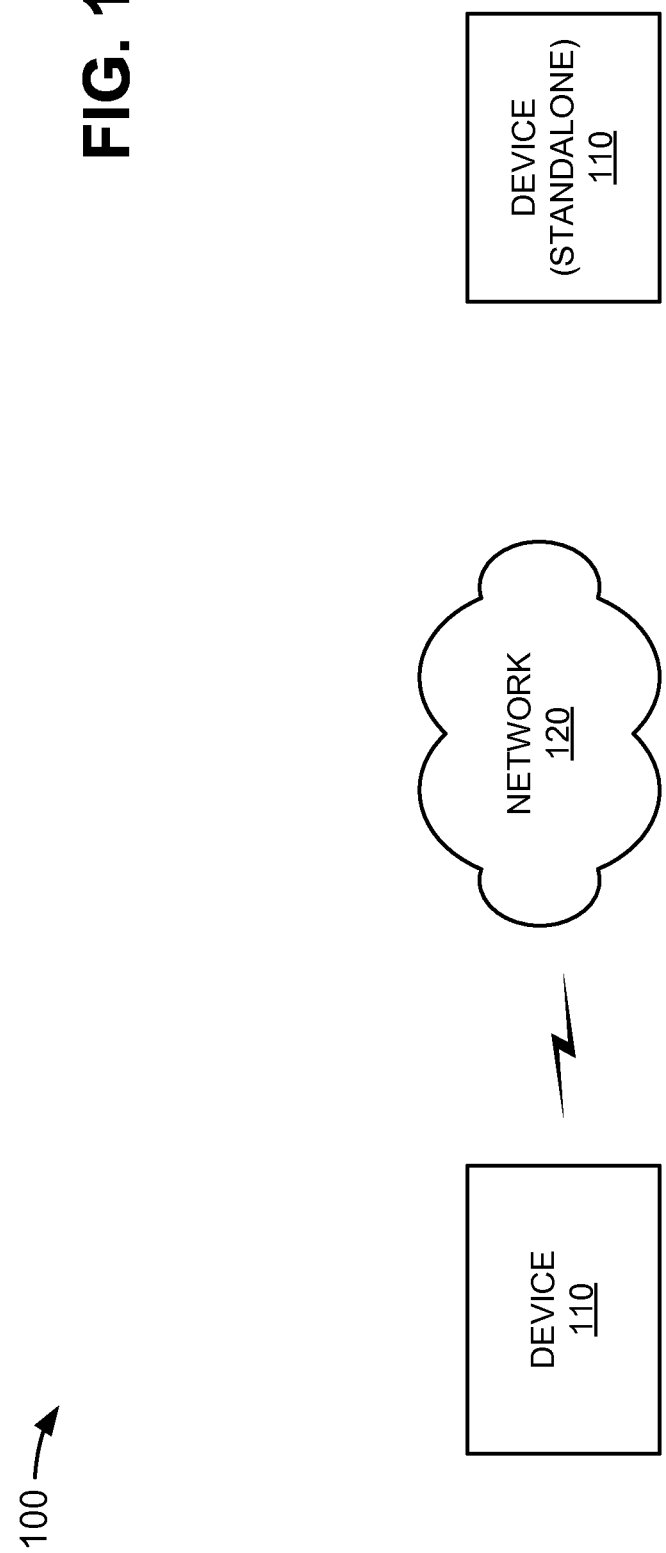
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include one or more devices 110 connected with a network 120, and/or one or more standalone devices 110 (i.e., not connected with network 120). Components of network 100 may interconnect via wired and/or wireless connections or links. Two devices 110 and a single network 120 have been illustrated in FIG. 1 for simplicity. In practice, there may be more devices 110 and/or networks 120. Also, in some instances, one or more of the components of network 100 may perform one or more tasks described as being performed by another one or more of the components of network 100.

In an exemplary implementation, device 110 may include a network device, such as a gateway, a router, a switch, a firewall, a network interface card (NIC), a hub, a bridge, a proxy server, an optical add-drop multiplexer (OADM), or some other type of device that processes and/or transfers traffic (e.g., a device that is capable of transmitting information to and/or receiving information from other devices 110 via network 120). In another exemplary implementation, device 110 may include a standalone device (e.g., not connected to network 120), such as a laptop computer, a personal computer, a workstation, or other types of computation devices.

Network 120 may include one or more networks of any type. For example, network 120 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

Although FIG. 1 shows exemplary components of network 100, in other implementations, network 100 may contain fewer components, different components, differently arranged components, or additional components than depicted in FIG. 1.

Exemplary Network Device Configuration

Figure 2:
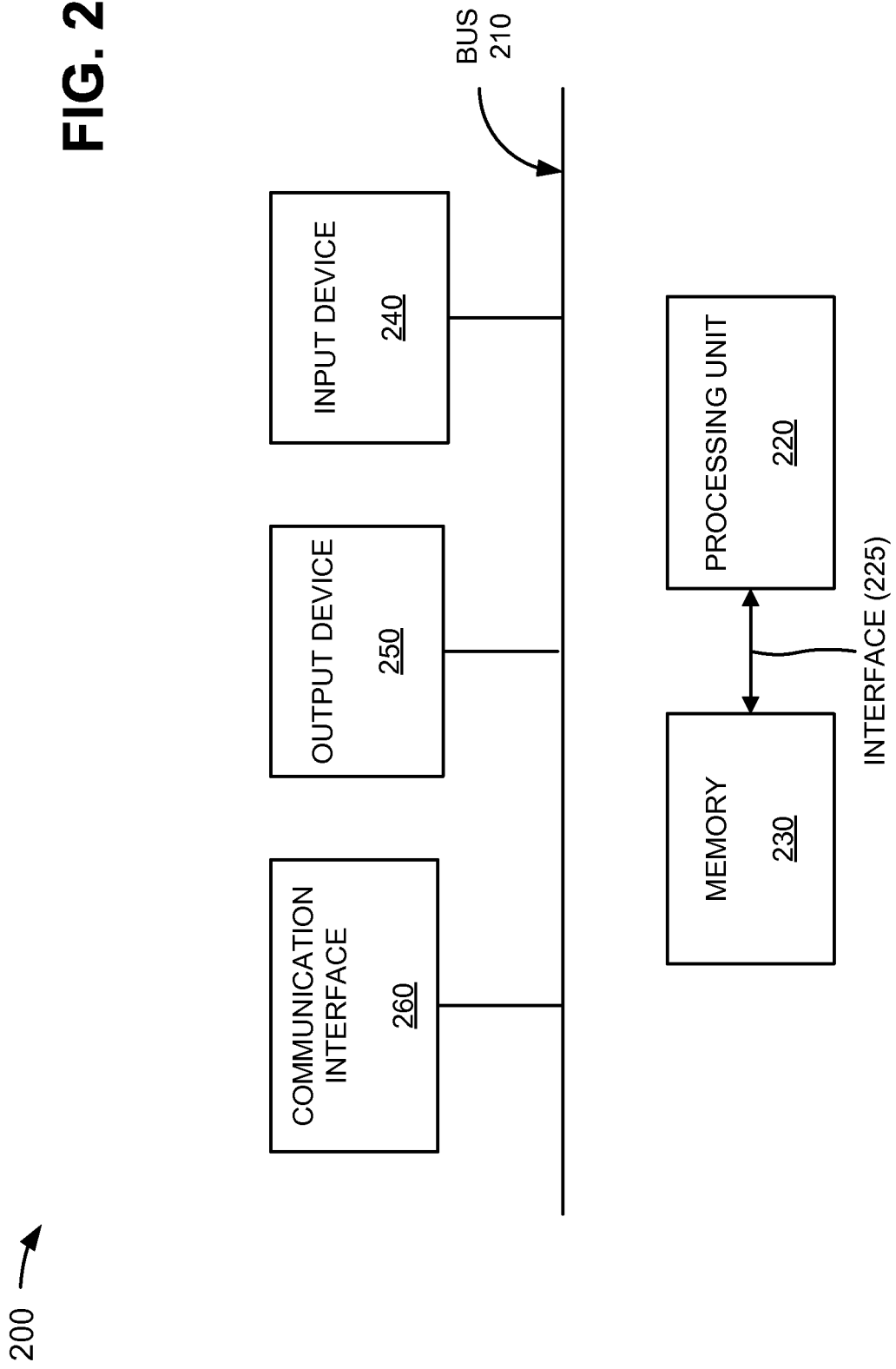
FIG. 2 is a diagram of exemplary components of a device depicted in FIG. 1.

FIG. 2 illustrates a diagram of exemplary components of a device 200 that may correspond to one of devices 110. As shown, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application-specific integrated circuits (ASICs), field-programmable gate arrays (FPGAs), or the like.

As further shown in FIG. 2, an interface 225 may be provided between processing unit 220 and memory 230. Interface 225 may include an optical, a wired, or a wireless connection that enables communication between processing unit 220 and memory 230.

Memory 230 may include a random access memory (RAM) or another type of dynamic storage device that stores information and instructions for execution by processing unit 220, a read only memory (ROM) or another type of static storage device that stores static information and instructions for processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices 110.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Exemplary Memory/Memory Interface Configurations

FIG. 3 is a diagram of exemplary interactions among components of an exemplary portion 300 of device 110. As shown, portion 300 of device 110 may include a memory controller 310, one or more memories 320 (e.g., and associated serial interfaces 325), a clock 330, and a clocking distributor 340. Components of portion 300 of device 110 may interconnect via wired and/or wireless connections. In an exemplary implementation, device 110 may include one or more portions 300.

Memory controller 310 may include a digital circuit that manages flows of data to and/or from memories 320. Memory controller 310 may be a separate device (or chip) or may be integrated into another device (or chip), such as a microprocessor. Memory controller 310 may communicate with memories 320 via serial interfaces 325. In one example, memory controller 310 may include logic to read and write dynamic RAM (DRAM) and to refresh the DRAM.

Each memory 320 may include a RAM or another type of dynamic storage device that stores information and instructions for execution by a processor (e.g., processing unit 220); a ROM or another type of static storage device that stores static information and instructions for execution by a processor (e.g., processing unit 220); and/or some other type of magnetic or optical recording medium and its corresponding drive for storing information and/or instructions. In an exemplary implementation, memories 320 may correspond to memory 230 of device 200 (FIG. 2). As shown in FIG. 3, each memory 320 may include a corresponding serial interface 325. Providing serial interface 325 on memory 320 (e.g., "on chip") may improve latency for memory 320 and serial interface 325, may increase power for device 110, may increase available space in device 110, etc.

Serial interface 325 may include an interface that provides serial communication (e.g., sequentially sending data one bit at a time) to and/or from memory controller 310. In one example, serial interface 325 may include an AC-coupled interface (e.g., with AC-coupled capacitors). In another example, serial interface 325 may include one or more serial links (e.g., transmitter and receiver pairs) that enable data streams to be provided to and/or received from memory controller 310.

In an exemplary implementation, memories 320 (e.g., and serial interfaces 325) may be provided adjacent to memory controller 310 such that a short channel, as shown in FIG. 3, may be provided between memory controller 310 and memories 320 (e.g., and serial interfaces 325). The short channel may reduce insertion loss and return loss between memory controller 310 and memories 320; may minimize an amount of transmission and reception equalization required between memory controller 310 and memories 320; and may reduce latencies associated with serial interfaces 325. Further details of memory 320 and serial interface 325 are provided below in connection with, for example, FIGS. 4A and 4B.

Clock 330 may include a device that generates a clock signal 350. In one example, clock 330 may include a crystal oscillator (e.g., an electronic circuit that uses a mechanical resonance of a vibrating crystal of piezoelectric material to create an electrical signal with a precise frequency). Clock signal 350 may include a signal that oscillates between a high and a low state and may be utilized to coordinate operations of memory controller 310 and memories 320. In one example, clock signal 350 may include an electrical signal with a precise frequency.

Clock distributor 340 may include a device that receives clock signal 350 from clock 330, and provides synchronous clocking 360 (e.g., based on clock signal 350) across memory controller 310 and memories 320. Providing synchronous clocking 360 across memory controller 310 and memories 320 may mitigate latency impact due to frequency offset (e.g., in ppm) between memory controller 310 and memories 320 and associated phase build up. Synchronous clocking 360 may also reduce a need for extra pins, extra power, and additional area required by memories 320 (e.g., and/or serial interfaces 325).

Although FIG. 3 shows exemplary components of portion 300 of device 110, in other implementations, device 110 may contain fewer components, different components, differently arranged components, or additional components than depicted in FIG. 3. For example, although FIG. 3 shows three memories 320, in other implementations, device 110 may include more than three memories 320. Alternatively, or additionally, one or more components of device 110 may perform one or more other tasks described as being performed by one or more other components of device 110.

FIGS. 4A-4C are diagrams of exemplary interactions among components of another exemplary portion 400 of device 110. As shown, portion 400 may include memory controller 310, a single memory 320, and a single serial interface 325. Memory controller 310, memory 320, and serial interface 325 may include the features described above in connection with, for example, FIG. 3. As further shown in FIGS. 4A-4C, serial interface 325 may include multiple serial links 410-0 through 410-7 (collectively referred to as "serial links 410" and, in some instances, singularly as "serial link 410"), and memory 320 may include a phase information distributor 420.

Encoding data provided to or from a serial interface (e.g., serial interface 325) introduces extra latency since the serial interface has to wait for an entire code to arrive before the serial interface can interpret the code. For example, for each of serial links 410, if a link speed is ten (10) gigabits per second (Gbps), each bit takes 0.1 nanoseconds (ns) to move between memory controller 310 and memory 320. With an 8B/10B encoding scheme, each code is ten (10) bits, so serial link 410 needs to wait one nanosecond to receive the entire code before serial link 410 can interpret the code. With a 64B/66B encoding scheme, serial link 410 needs to wait 6.6 ns to receive the entire code before serial link 410 can interpret the code. The 5.6 ns (i.e., 6.6 ns-1 ns) difference represents extra latency serial interface 325 would experience using the 64B/66B encoding scheme as opposed to the 8B/10B encoding scheme. On the other hand, the 8B/10B encoding scheme has only eighty percent (80%) efficiency in terms of a "useful bits" to "total transmitted bit" ratio, while the 64B/66B encoding scheme has a corresponding efficiency of about ninety-seven percent (97%). Thus, an efficient encoding scheme introduces extra latency, but a low latency encoding scheme has poor efficiency.

Implementations described herein may provide low latency encoding (e.g., 8B/10B encoding) on one of the eight serial links 410. In one exemplary implementation, as described in connection with FIG. 4A, one of serial links 410 may be designated as a master serial link, while the remaining serial links 410 may designated as slave serial links. The master serial link may provide low latency encoding. In another exemplary implementation, as described in connection with FIGS. 4B and 4C, each of serial links 410 may be sequentially used to provide low latency encoding. Such implementations may provide a total efficiency (e.g., on the eight serial links 410) of about 97.5% (i.e., [7×10 (un-encoded serial links)+8 (encoded serial link)]/80), and at the same time, may maintain latency at one nanosecond (e.g., if 8B/10B encoding is used).

With reference to FIG. 4A, serial link 410 may include a transmitter and receiver pair that enables data streams to be provided to and/or received from memory controller 310. In an exemplary implementation, serial link 410 may include a Serializer/Deserializer (SerDes). A SerDes may include an integrated circuit (IC) transceiver that converts parallel data to serial data and vice-versa. A transmitter section of a SerDes may include a parallel-to-serial converter, and a receiver section of a SerDes may include a serial-to-parallel converter. A SerDes may facilitate transmission of parallel data between two points over serial streams, which may reduce a number of data paths and connecting pins or wires required for serial interface 325. In one example, serial link 410 may include a 8B/10B SerDes that maps each data byte to a ten bit code before serializing the data. A deserializer of the 8B/10B SerDes may utilize a reference clock to monitor a recovered clock from a bit stream.

Phase information distributor 420 may include a device that provides phase information 430 to serial links 410. Phase information 430 may include information used to calibrate and/or update phases of CDR circuits associated with slave serial links 410-1 through 410-7 in order to provide correct operation of data streams 450 (e.g., without restriction of maximum CIDs).

As further shown in FIG. 4A, serial interface 325 (e.g., or memory 320) may include logic to designate one of serial links 410 (e.g., serial link 410-0) as a master serial link, and to designate the remaining serial links 410 (e.g., serial links 410-1 through 410-7) as slave serial links. Master serial link 410-0 may include logic to transmit or receive an encoded data stream 440 to/from memory controller 310. Data stream 440 may be encoded using a 4B/5B encoding scheme, a 7B/8B encoding scheme, an 8B/10B encoding scheme, a 9B/10B encoding scheme, a 31B/32B encoding scheme, a 64B/66B encoding scheme, or any other encoding scheme that provides scrambled data, DC balance, and low CIDs in a data stream.

As further shown in FIG. 4A, since master serial link 410-0 may have good CID, phase information distributor 420 may include logic to extract phase information 430 from master serial link 410-0, and to distribute phase information 430 to slave serial links 410-1 through 410-7.

Slave serial links 410-1 through 410-7 may include logic to transmit or receive un-encoded and scrambled data streams 450 to/from memory controller 310. Data streams 450 may not be encoded and may be scrambled such that data in data streams 450 may be randomly arranged.

In one exemplary implementation, serial interface 325 (e.g., or memory 320) may include logic to provide a timer, to determine whether the timer has expired, and to un-designate a particular serial link 410 (e.g., serial link 410-0) as the master serial link when the timer expires. The serial interface 325 (e.g., or memory 320) may further include logic to designate another serial link 410 as the master serial link, and to restart the timer. For example, serial interface 325 (e.g., or memory 320) may un-designate serial link 410-0 as the master serial link, and may designate serial link 410-1 as the master serial link. Master serial link 410-1 may transmit or receive encoded data stream 440 to/from memory controller 310, while slave serial links 410-0 and 410-2 through 410-7 may transmit or receive un-encoded and scrambled data streams 450 to/from memory controller 310.

As shown in FIG. 4B, memory 320 may not include phase information distributor 420, and serial interface 325 (e.g., or memory 320) may include logic to sequentially rotate a designated serial link 410 (e.g., serial link 410-0 in FIG. 4B). Designated serial link 410-0 may include logic to transmit or receive encoded data stream 440 to/from memory controller 310. While the remaining serial links (e.g., undesignated serial links 410-1 through 410-7 in FIG. 4B) may include logic to transmit or receive un-encoded and scrambled data streams 450 to/from memory controller 310. In one example, the designated serial link 410 may be changed in a particular sequential order. As shown in FIG. 4C, serial link 410-1 may be the designated serial link 410 at another point in time, while serial links 410-0 and 410-2 through 410-7 may be undesignated serial links 410. Designated serial link 410-1 may include logic to transmit or receive encoded data stream 440 to/from memory controller 310. While undesignated serial links 410-0 and 410-2 through 410-7 may include logic to transmit or receive un-encoded and scrambled data streams 450 to/from memory controller 310.

For example, if 8B/10B encoding is used, when a first ten bits of data are transmitted to serial links 410 (e.g., at a first time period), encoding may be performed on the data at serial link 410-0 (FIG. 4B). When a second ten bits of data are transmitted to serial links 410 (e.g., at a second time period), encoding may be performed on the data at serial link 410-1 (FIG. 4C). This process may be repeated until eighty (80) bits of data are transmitted to serial links 410, and encoding may return to serial link 410-0 (FIG. 4B) again. Thus, each serial link 410 may include an encoded word for every eighty (80) bits of data. Because every encoded word may have a deterministic CID, each serial link 410 may have a deterministic maximum CID of about eighty (80) or more bits of data. With such an arrangement, serial links 410 may be able to perform CDR on their own without a need for distribution of phase information 430. Furthermore, by rotating an encoded word, the efficiency and latency of serial interface 325 may be maintained.

The arrangements depicted in FIGS. 4A-4C may increase useable bandwidth and minimize latency associated with serial interface 325 (e.g., and/or memory 320) since only a single data stream needs to be encoded and decoded (e.g., rather than all of the data streams) at a time. Furthermore, the arrangements depicted in FIGS. 4A-4C may limit the maximum number of CIDs, and may provide no latency overhead.

Although FIGS. 4A-4C show exemplary components of portion 400 of device 110, in other implementations, device 110 may contain fewer components, different components, differently arranged components, or additional components than depicted in FIGS. 4A-4C. For example, although FIGS. 4A-4C show serial interface 325 with eight serial links 410, in other implementations, serial interface 325 may include more or fewer than eight serial links 410. In another example, serial links 410 may be provided in memory controller 310 and memory controller 310 may function in a manner similar to memory 320. In other words, the interactions described in connection with FIGS. 4A-4C may work in both directions (e.g., from memory controller 310 to memory 320 and vice versa). Alternatively, or additionally, one or more components of device 110 may perform one or more other tasks described as being performed by one or more other components of device 110.

Exemplary Process

FIGS. 5 and 6 are flow charts of an exemplary process 500 for providing a low latency serial interface according to implementations described herein. In one implementation, process 500 may be performed by device 110. In another implementation, some or all of process 500 may be performed by one or more components of device 110.

As illustrated in FIG. 5, process 500 may include applying a synchronous clocking across a memory and a memory controller provided in a device (block 510), designating a particular serial link of a plurality of serial links, of a serial interface provided in the memory, as a master serial link (block 520), and designating the remaining plurality of serial links as slave serial links (block 530). For example, in implementations described above in connection with FIGS. 3 and 4A, clock distributor 330 may receive clock signal 350 from clock 340, and may provide synchronous clocking 360 (e.g., based on clock signal 350) across memory controller 310 and memories 320. Serial interface 325 (e.g., or memory 320) may include logic to designate one of serial links 410 (e.g., serial link 410-0) as a master serial link, and to designate the remaining serial links 410 (e.g., serial links 410-1 through 410-7) as slave serial links.

As further shown in FIG. 5, process 500 may include transmitting or receiving an encoded data stream, via the master serial link, to or from the memory controller (block 540), and transmitting or receiving un-encoded and scrambled data streams, via the slave serial links, to or from the memory controller (block 550). For example, in implementations described above in connection with FIG. 4A, master serial link 410-0 may include logic to transmit or receive encoded data stream 440 to/from memory controller 310. Data stream 440 may be encoded using the 8B/10B encoding scheme, the 64B/66B encoding scheme, or any other encoding scheme that provides scrambled data, DC balance, and low CIDs in a data stream. Slave serial links 410-1 through 410-7 may include logic to transmit or receive un-encoded and scrambled data streams 450 to/from memory controller 310. Data streams 450 may not be encoded and may be scrambled such that data in data streams 450 may be randomly arranged.

Process block 520 may include the process blocks depicted in FIG. 6. As shown in FIG. 6, process block 520 may include determining whether a timer has expired (block 600), un-designating the particular serial link as the master serial link when the timer expires (block 610), designating another serial link of the plurality of serial links as the master serial link (block 620), and restarting the timer (block 630). For example, in implementations described above in connection with FIG. 4A, serial interface 325 (e.g., or memory 320) may include logic to provide a timer, to determine whether the timer has expired, and to un-designate a particular serial link 410 (e.g., serial link 410-0) as the master serial link when the timer expires. The serial interface 325 (e.g., or memory 320) may further include logic to designate another serial link 410 as the master serial link, and to restart the timer. Serial interface 325 (e.g., or memory 320) may un-designate serial link 410-0 as the master serial link, and may designate serial link 410-1 as the master serial link.

CONCLUSION

Implementations described herein may provide systems and/or methods that utilize clock recovery, scrambled data, on-chip AC-coupled interfaces with synchronous clocking between a transmitter and a receiver, and low latency data encoding. The systems and/or methods may ensure a DC-balanced data pattern and deterministic CIDs with improved clock data recovery bandwidth and overall serial link BER. The systems and/or methods may enable serial interfaces to be embedded in memories rather than provided on a board associated with the memories (e.g., which may be prohibitive due to size constraints of the board). In addition, the systems and/or methods may distribute a synchronous system clock to a memory controller and to the memories, which may reduce an overall latency for the serial interfaces.

The foregoing description of implementations provides illustration and description, but is not intended to be exhaustive or to limit the invention to the precise form disclosed. Modifications and variations are possible in light of the above teachings or may be acquired from practice of the invention.

For example, although a serial memory interface was described above, implementations described herein may be applied to any device or component of a device that utilizes a serial interface or an optical interface. Furthermore, implementations described herein may be applied to optical, wired, and/or wireless based interfaces.

For example, while series of blocks have been described with regard to FIGS. 5 and 6, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, one or more implementations described herein may be provided via "logic" that performs one or more functions. The term "logic," as used herein, may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a device that includes a memory and a memory controller, the method comprising:
designating, by the device and as a master serial link, a particular serial link of a plurality of serial links associated with a serial interface included in the memory;
designating, by the device and as slave serial links, other serial links of the plurality of serial links,
the other serial links differing from the particular serial link;
providing, via the master serial link, an encoded data stream;
providing, via the slave serial links, un-encoded and scrambled data streams;
extracting, by the device, phase information from the encoded data stream; and
processing, by the device, the un-encoded and scrambled data streams using the extracted phase information,
processing the un-encoded and scrambled data streams including:
coordinating respective phases associated with the slave serial links based on the extracted phase information, and
unscrambling the un-encoded and scrambled data streams based on coordinating the respective phases associated with the slave serial links.

2. The method of claim 1, further comprising:
applying synchronous clocking across the memory,
where the encoded data stream and the un-encoded and scrambled data streams are provided based on the synchronous clocking.

3. The method of claim 1, where providing, via the master serial link, the encoded data stream includes one of:
transmitting, via the master serial link, the encoded data stream to the memory controller, or
receiving, via the master serial link, the encoded data stream from the memory controller.

4. The method of claim 1, where providing, via the slave serial links, the un-encoded and scrambled data streams includes one of:
transmitting, via the slave serial links, the un-encoded and scrambled data streams to the memory controller, or receiving, via the slave serial links, the un-encoded and scrambled data streams from the memory controller.

5. The method of claim 1, further comprising:
determining whether a timer, associated with the master serial link, has expired,
un-designating the particular serial link as the master serial link when the timer expires,
designating, based on un-designating the particular serial link, another serial link, of the plurality of serial links, as the master serial link, and
restarting the timer based on designating the other serial link.

6. The method of claim 5, where:
the plurality of serial links is provided in a particular order, and
the other serial link is designated as the master serial link based on the particular order.

7. The method of claim 1, where the encoded data stream is encoded via at least one of:
a 4B/5B encoding scheme,
a 7B/8B encoding scheme,
an 8B/10B encoding scheme,
a 9B/10B encoding scheme,
a 31B/32B encoding scheme, or
a 64B/66B encoding scheme.

8. The method of claim 1, where the encoded data stream is encoded via an encoding scheme that provides scrambled data, direct current (DC) balance, and low consecutive identical digits (CIDs) in a data stream.

9. The method of claim 1, where each of the plurality of serial links comprises a Serializer/Deserializer (SerDes).

10. The method of claim 1, where the device comprises at least one of:
a gateway,
a router,
a switch,
a firewall,
a network interface card (NIC),
a hub,
a bridge,
a server,
a proxy server,
an optical add-drop multiplexer (OADM),
a personal computer,
a laptop computer, or
a workstation.

11. A device comprising:
a memory that includes a serial interface,
the serial interface being associated with a plurality of serial links; and
a processor to:
designate a particular serial link, of the plurality of serial links, as a master serial link,
designate other serial links, of the plurality of serial links and that differ from the particular serial link, as slave serial links,
provide, via the master serial link, an encoded data stream,
provide, via the slave serial links, un-encoded and scrambled data streams,
extract phase information from the encoded data stream, and
process the un-encoded and scrambled data streams using the extracted phase information,
the processor, when processing the un-encoded and scrambled data streams, being further to:
coordinate respective phases associated with the slave serial links based on the extracted phase information, and
unscramble the un-encoded and scrambled data streams based on coordinating the respective phases associated with the slave serial links.

12. The device of claim 11, further comprising:
a memory controller connected to the serial interface,
where the processor is further to apply synchronous clocking across the memory and the memory controller, and
where processor provides the encoded data stream and the un-encoded and scrambled data streams based on applying the synchronous clocking.

13. The device of claim 12, where the processor, when providing the encoded data stream, is further to:
transmit, via the master serial link, the encoded data stream to the memory controller, or
receive, via the master serial link, the encoded data stream from the memory controller.

14. The device of claim 12, where the processor, when providing un-encoded and scrambled data streams, is further to:
transmit, via the slave serial links, the un-encoded and scrambled data streams to the memory controller, or
receive, via the slave serial links, the un-encoded and scrambled data streams from the memory controller.

15. The device of claim 11, where the processor is further to:
determine whether a timer, associated with the master serial link, has expired,
un-designate the particular serial link as the master serial link when the timer expires,
designate, based on un-designating the particular serial link, another serial link, of the plurality of serial links, as the master serial link, and
restart the timer based on designating the other serial link.

16. The device of claim 15, where:
the plurality of serial links is provided in a particular order, and
the other serial link is designated as the master serial link based on the particular order.

17. The device of claim 11, where the encoded data stream is encoded via an encoding scheme that provides scrambled data, direct current (DC) balance, and low consecutive identical digits (CIDs) in a data stream.

18. The device of claim 11, where the encoded data stream is encoded via at least one of:
a 4B/5B encoding scheme,
a 7B/8B encoding scheme,
an 8B/10B encoding scheme,
a 9B/10B encoding scheme,
a 31B/32B encoding scheme, or
a 64B/66B encoding scheme.

19. The device of claim 11, where each of the plurality of serial links comprises a Serializer/Deserializer (SerDes).

20. A non-transitory computer-readable memory to store instructions, the instructions comprising:
one or more instructions that, when executed by one or more processors, cause the one or more processors to:
apply synchronous clocking across a first component and a second component, the first component including a serial interface associated with a plurality of serial links;
designate a particular serial link, of the plurality of serial links, as a designated serial link;

exchange, via the designated serial link, an encoded data stream with the second component based on the synchronous clocking;
exchange, via other serial links of the plurality of serial links, un-encoded and scrambled data streams to or from the second component,
the other serial links differing from the particular serial link;
determine phase information associated with the encoded data stream; and
process the un-encoded and scrambled data streams using the phase information,
the one or more instructions, to process the un-encoded and scrambled data streams, further including:
at least one instruction to:
coordinate respective phases associated with the other serial links based on the phase information, and
unscramble the un-encoded and scrambled data streams based on coordinating the respective phases associated with the other serial links.

21. The non-transitory computer-readable memory of claim 20, where the instructions further comprise:
one or more instructions to apply the synchronous clocking to a memory controller associated with the memory.

22. The non-transitory computer-readable memory of claim 21, where the instructions further comprise:
one or more instructions to:
transmit, via the designated serial link, the encoded data stream to the memory controller, or
receive, via the designated serial link, the encoded data stream from the memory controller.

23. The non-transitory computer-readable memory of claim 21, where the instructions further comprise:
one or more instructions to:
transmit, via the other serial links, the un-encoded and scrambled data streams to the memory controller, or
receive, via the other serial links, the un-encoded and scrambled data streams from the memory controller.

24. The non-transitory computer-readable memory of claim 21, where the instructions further comprise:
one or more instructions to:
determine whether a timer, associated with the particular serial link, has expired,
un-designate the particular serial link after the timer expires,
designate, based on un-designating the particular serial link, one of the other serial links, and
restart the timer based on designating the one of the other serial links.

25. The non-transitory computer-readable memory of claim 24, where the one or more instructions, to designate the one of the other serial links, further include:
one or more instructions to select the one of the other serial links based on a particular order associated with the plurality of serial links.

* * * * *